(12) United States Patent
Irvin, Jr.

(10) Patent No.: US 6,464,271 B1
(45) Date of Patent: Oct. 15, 2002

(54) COOKING UTENSIL

(76) Inventor: Herschel G. Irvin, Jr., 505 Amesbury Rd., Lancaster, PA (US) 17601-3515

( * ) Notice: Subject to any disclaimer, the term of this patent is extended or adjusted under 35 U.S.C. 154(b) by 0 days.

(21) Appl. No.: 09/961,674

(22) Filed: Sep. 24, 2001

Related U.S. Application Data

(60) Provisional application No. 60/289,482, filed on May 8, 2001.

(51) Int. Cl.[7] ................................................. A47J 43/28
(52) U.S. Cl. ........................................... 294/26; 30/340
(58) Field of Search ........................ 294/1.1, 5, 9, 19.3, 294/26, 55.5, 61; 30/322, 340; 99/419, 421 A; D7/683

(56) References Cited

U.S. PATENT DOCUMENTS

| | | | | |
|---|---|---|---|---|
| 1,202,120 A | * | 10/1916 | Stuckel | 294/26 |
| 2,372,743 A | * | 4/1945 | Schofield | 24/600.4 |
| 2,604,350 A | * | 7/1952 | Taylor | 294/26 |
| 3,078,787 A | * | 2/1963 | Arseneault | 294/61 |
| 3,162,475 A | * | 12/1964 | Van Allen | 294/26 |
| 3,380,092 A | * | 4/1968 | Golczynski | 12/103 |
| D273,075 S | * | 3/1984 | Hayden | 294/26 |
| 5,628,244 A | * | 5/1997 | Holliday | 99/419 |
| 6,003,914 A | * | 12/1999 | Brisbin | 29/278 |
| 6,312,030 B1 | * | 11/2001 | Johannes et al. | 294/26 |

FOREIGN PATENT DOCUMENTS

| | | | | |
|---|---|---|---|---|
| GB | 2239786 | * | 7/1991 | 294/26 |

OTHER PUBLICATIONS

Printed pages from www.pigtailff.com Web site, K2 Development, P.O. Box 498, Pine Plains, NY 12567, No Date.

* cited by examiner

*Primary Examiner*—Dean J. Kramer
(74) *Attorney, Agent, or Firm*—Barley, Snyder, Senft & Cohen, LLC

(57) ABSTRACT

A utensil for use in cooking is disclosed. The utensil has a handle provided at one end and a hook provided at the opposite end. The hook is designed to impale or engage the food items. The utensil is ergonomically designed to minimize stress to the user. Additionally, a shaft of the utensil extends between the hook and the handle. The shaft offset from the centerline of the handle to allow the utensil to rotate when the utensil is laid on a surface, thereby insuring that the point of the hook will also be pointed toward the surface. In use, the shaft is maintained parallel to the cooking surface to insure that the user's hand is not exposed to the heat of the cooking surface.

20 Claims, 7 Drawing Sheets

COOKING UTENSIL

This application claims the benefit of U.S. Provisional Application No. 60/289,482, filed May 8, 2001.

FIELD OF THE INVENTION

The invention is directed to a utensil used for cooking. In particular, a utensil used to manipulate meat, poultry, et al. is disclosed.

BACKGROUND OF THE INVENTION

Many utensils are available which facilitate the manipulation of food placed on a grill or other cooking surface. While the style and appearance of these utensils may vary according to whether the intended use is for commercial or recreational use, the underlying functionality of the utensils is the same.

Types of utensils found in the prior art include spatulas, forks, and tongs. Although the use of the various utensils may vary, generally a portion of the utensil is positioned under or into the piece of meat (or other food item). Once positioned properly, the food item is lifted and flipped over or removed from the cooking surface. The act of flipping the food item requires that the food preparer utilize various hand, wrist, and arm muscles. The motion required, particularly if repeated over many cycles, may contribute to the aggravation of carpal tunnel syndrome and other such conditions. This is particularly evident with commercial chefs which must repeat the flipping action many times during the course of a day.

The problem described above is worsened due to the weight of the utensils. As prior art utensils are generally substantial and made from relatively heavy material, the weight of the utensil can become significant. This weight can be limiting, particularly if the utensil is continually used over many cycles.

Additionally, many utensils require that the hand of the food preparer be positioned over the cooking surface during the preparation of the food. This can cause the hand of the food preparer to be burned.

Cleaning of the utensil can also be of concern. As known utensils generally have a substantial surface which cooperates with the food, portions of the food may be trapped in the head of the utensil or in any recesses provided thereon. This can lead to unsanitary conditions, particularly in commercial environment.

It would, therefore, be beneficial to develop a utensil for use in food preparation which is easy to clean, safe to use, and which is ergonomically designed.

SUMMARY OF THE INVENTION

The invention is directed to a utensil for use in the preparation of food which is configured to easily engage and manipulate the food without exposing the user's hand to direct heat. The ergonomic design also facilitates the user's enjoyment of the utensil. The utensil of the present invention has numerous advantages over traditional utensils. The use of the hook and shaft securely impales and manipulates food without the need to reach into the higher heat zone often found above cooking surfaces. Danger of burns from ordinary occurrences such as flareups are thereby reduced.

In particular, the invention is directed to a cooking utensil which has a handle with a shaft receiving end and an opposed end. A shaft extends from the shaft receiving end in a direction away from the opposed end. A food manipulation member extends from the shaft at a free end of the shaft which is removed from a fixed end of the shaft which engages the handle. The food manipulation member extends from the shaft in essentially a perpendicular direction to the shaft and has an arcuate configuration with a point provided at the end of the food manipulation member which is removed from the shaft. As the cooking utensil is used to prepare food, the shaft remains essentially parallel to a cooking surface to prevent a user's hand from being exposed to the heat of the cooking surface.

The invention is also directed to a cooking utensil in which a free end of the food manipulation member is offset from the longitudinal axis of the handle, the free end having a point provided thereon, whereby regardless of the rotational orientation of the shaft when placed on a flat surface, the cooking utensil will rotate such that the point is in contact with the flat surface. Additionally, the invention is directed to a cooking utensil wherein a point is provided at the end of the food manipulation member and is offset from the longitudinal axis of the handle, whereby as the handle is rotated, the point pierces a surface of a food item, allowing the food item to be picked up and manipulated.

When compared to other traditional utensils, this utensil presents less possibility of serious injury. A fall on most forks currently in use for cooking could result in a severe stab wound. While the same accident with the utensil described herein results in only superficial injury. Deep penetration is much less likely due to the blunted configuration of the rounded hook that is perpendicular to the shaft. Also, in the present invention the tip need not have a needle sharp tip to be effective.

Storage of the utensil can be accomplished in a variety of ways that lessen the danger of unintentional injury when compared to a fork or other known utensils. When laid on a flat surface the point is rotated to point down to rest on the surface. The hooked end may also fit into a slot or other recess thereby lessening the opportunity for contact with the point.

The ergonomics of the utensil can best be appreciated through use. When engaging foods with forks, spatulas, tongs or other instruments the food must first be engaged by relying in part on the inertia of the food for stabbing, sliding, grabbing or other movement to secure it in or on the instrument. There then remains the challenge to pickup and turn or move the item without dropping it. This is often performed with the hand above the level of the cooking surface. With the utensil this movement is reduced to holding the shaft near parallel to the cooking surface, placing the point of the hook on the food, rotating the handle past 90 degrees to impale the food and then manipulating it in whatever manner is desired. Disengagement is equally effortless by rotating the handle the opposite direction. This type of motion places much less stress on the user's hand, wrist, and arm.

Thorough cleanup is also simple and easy. As no recesses or openings are provided on the shaft or hook of the utensil, there is no place for residue to be captured.

DETAILED DESCRIPTION OF THE EMBODIMENT SHOWN

Figure 1:
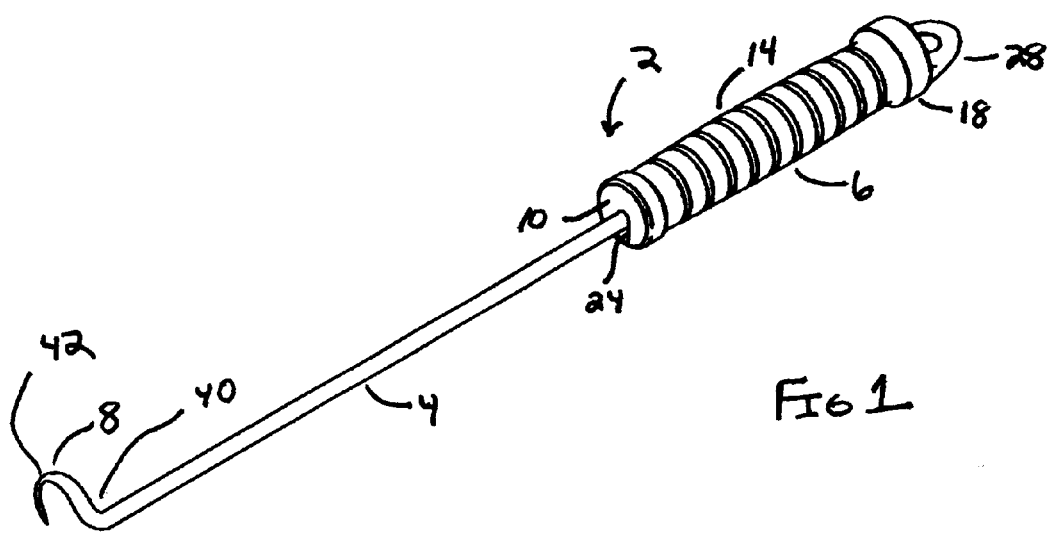
FIG. 1 is a perspective view of a first embodiment of a utensil according to the present invention.
Figure 2:
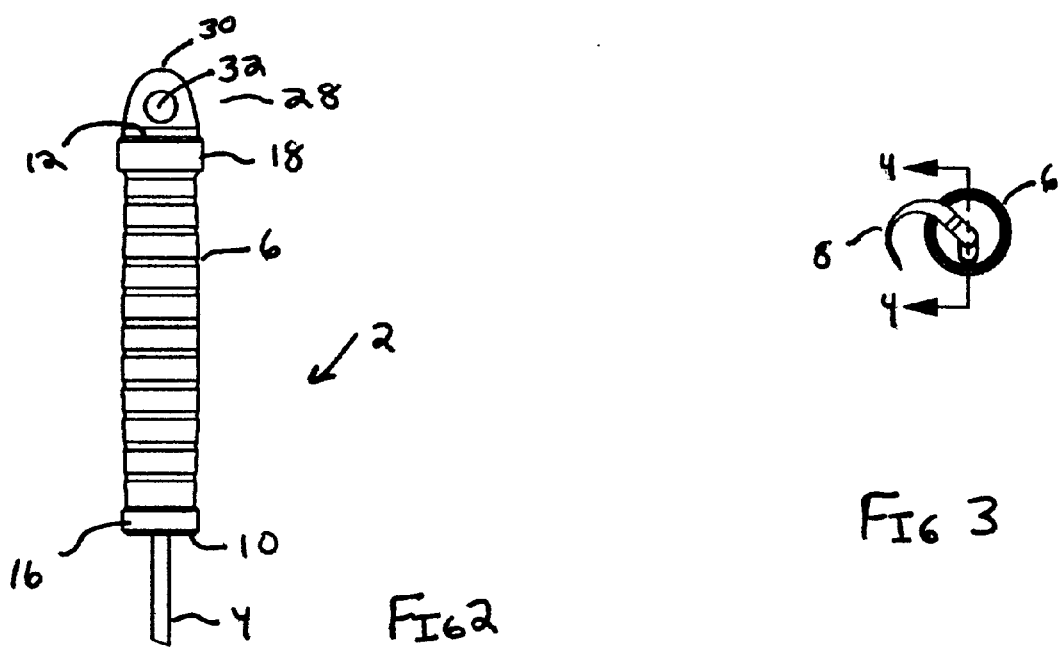
FIG. 2 is a top view of the utensil shown in FIG. 1.
Figure 3:
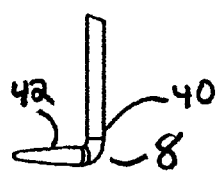
FIG. 3 is an end view of the utensil shown in FIG. 1.
Figure 4:
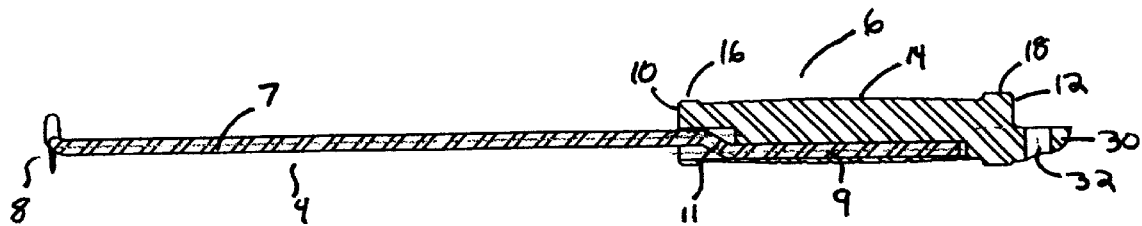
FIG. 4 is a cross sectional view taken along line 4—4 of FIG. 3.

Referring to FIGS. 1 through 7, a first embodiment of a utensil 2 for use in the manipulation of food is shown. The utensil is comprised of a shaft 4 having a handle 6 at one end and a food manipulation member or tapered hook 8 at the other end. In the embodiment shown, the shaft is made from stainless steel. However, the shaft can be made from other material which is deemed safe for use with food products. The shaft diameter and length may be varied according to the needs of different users. In the embodiment shown, the shaft has a diameter of 0.25 inches and a length of approximately 18 inches. The shaft 4, as shown in FIG. 4, has a first portion 7 and a second portion 9 connected by a transition section 11. The longitudinal axis of the second portion extends parallel to and spaced from the longitudinal axis of the first portion 7.

Figure 11:
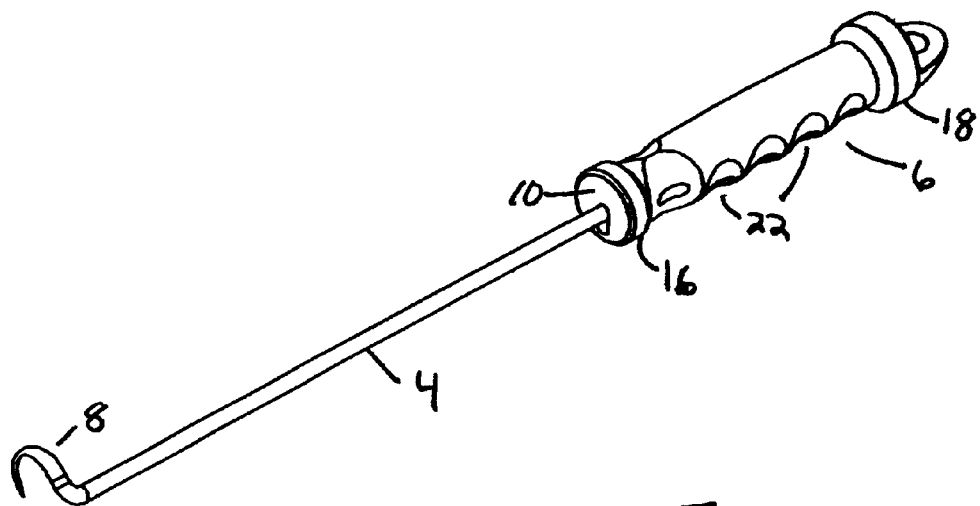
FIG. 11 is a perspective view of a third embodiment of a utensil according to the present invention.
Figure 12:
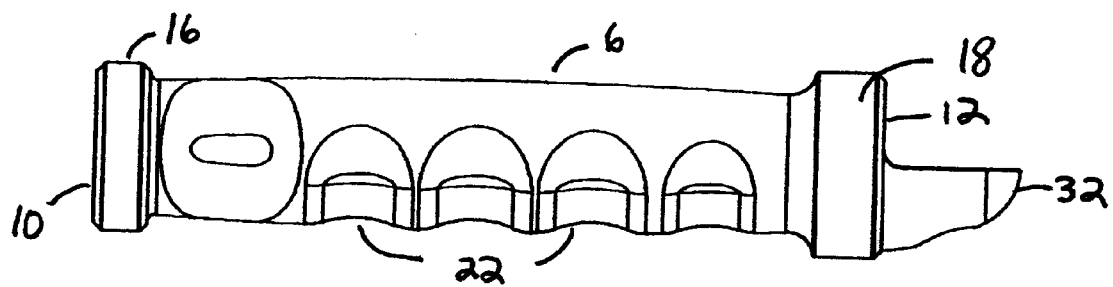
FIG. 12 is a side view of a handle of the utensil shown in FIG. 11.

Referring to FIGS. 1 through 7, the handle 6 has a generally cylindrical configuration with a shaft receiving end 10 and an oppositely facing closed end or opposed end 12. A gripping surface 14 is provided about the circumference of the handle 6. In the embodiment shown, the diameter of the gripping surface 14 is larger at the center and reduced proximate the ends 10, 12. Shoulders 16, 18 are provided adjacent end 10, 12 respectively and extend circumferentially about the handle 6. The shoulders 16, 18 are provided to maintain the user's hand in position. The shoulders also provide bearing surfaces which facilitate rotation of the utensil when the utensil is laid on a surface, as will be more fully discussed. The particular configuration of the handle can be varied without departing from the scope of the invention. For example, the gripping surface may have a textured surface or circumferentially extending recesses to provide for better gripping characteristics. This is a beneficial feature, particularly as the user's hand is exposed to grease and the like. An alternate embodiment of the handle is shown in FIGS. 11 through 12. In this embodiment, the handle has indentations 22 which cooperate with a user's fingers. This configuration allows the user to properly grip the handle. In addition, as the indentations 22 are only positioned on one side of the handle, the tapered hook 8 of the utensil is positioned in proper position for use when held in the user's hand. As the only difference between the embodiment shown in FIGS. 1 through 7 and that shown in FIGS. 11 and 12 relates to the indentations 22, the same reference number are used for the same parts in both embodiments. In any embodiment, the handle may be composed of a variety of materials such as wood, metal, or plastic so long as the material has the appropriate heat characteristics which allow the handle to be exposed to cooking temperatures without causing the handle to deform.

As shown in the embodiments of FIGS. 1 through 7 and 11 through 12, a storage mechanism 28 may extend from the closed end 12 of the handle 6 in a direction away from the shaft 4. In the embodiment shown, the storage mechanism 28 has a projection 30 with an opening 32 extending therethrough. As best shown in FIG. 4, the storage mechanism 28 is offset from the longitudinal axis of the handle 6 in the same direction as portion 9 of the shaft 4. A peg or hook-like device (not shown) can be positioned in the opening 32 to allow the utensil 2 to be hung on a wall or the like. Other types of conventionally know storage mechanism (i.e. straps, shoulders, etc.) can be used without departing from the scope of the invention. In addition, the shaft may have magnetic properties allowing the utensil to magnetically hang on a wall or the like, thereby eliminating the need for a separate storage mechanism.

Figure 5:
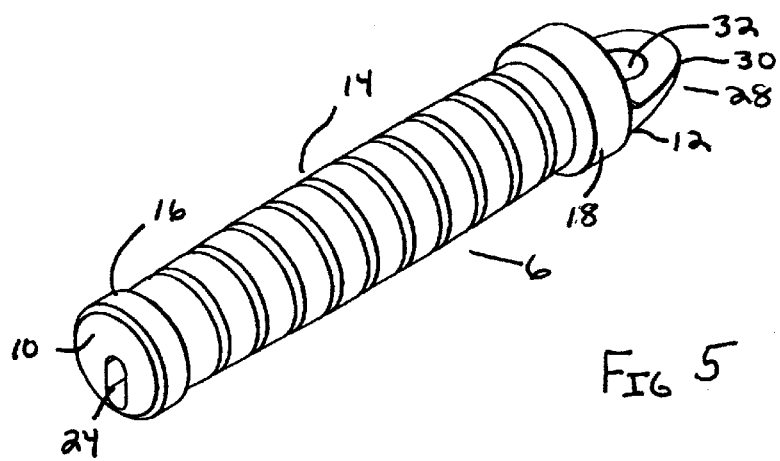
FIG. 5 is a perspective view of a handle of the utensil shown in FIG. 1.
Figure 6:
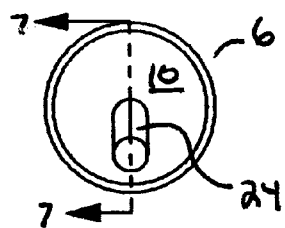
FIG. 6 is an end view of the handle of FIG. 5.
Figure 7:
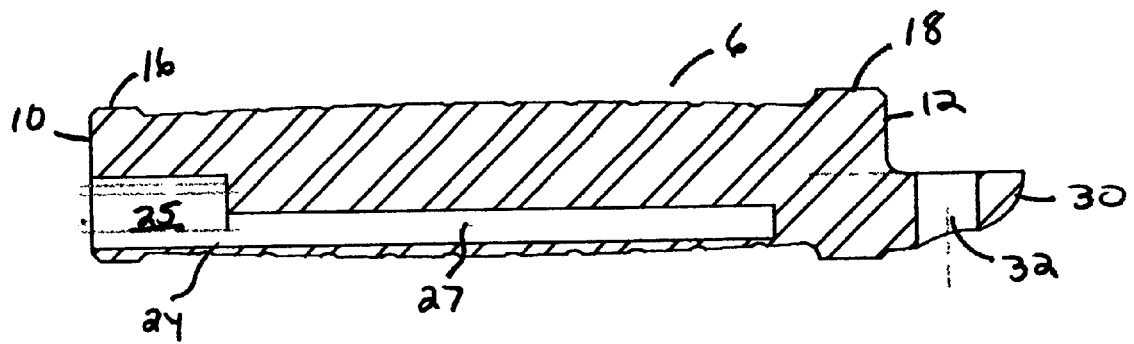
FIG. 7 is a cross sectional view taken along line 7—7 of FIG. 6.

As best shown in FIGS. 5 through 7, a shaft receiving opening 24 extends from the shaft receiving end 10 toward the closed end 12. In the embodiment shown, the opening 24 has a wide portion 25 provided proximate the shaft receiving end 10 and a reduced portion 27 which extends from the wide portion 25 toward the closed end 12. The longitudinal axis of the reduced portion is offset from the longitudinal axis of the handle 6. As is best shown in FIG. 4, the shaft 4 is inserted into the opening 24 and maintained in position by friction, glue, or other similar known methods. Alternatively, the handle may be molded over the shaft, thereby retaining the shaft in the handle. In either case, the second portion 9 is positioned in the reduced portion 27. The wide portion 25 is dimensioned to receive the transition section 11 therein.

Figure 9:
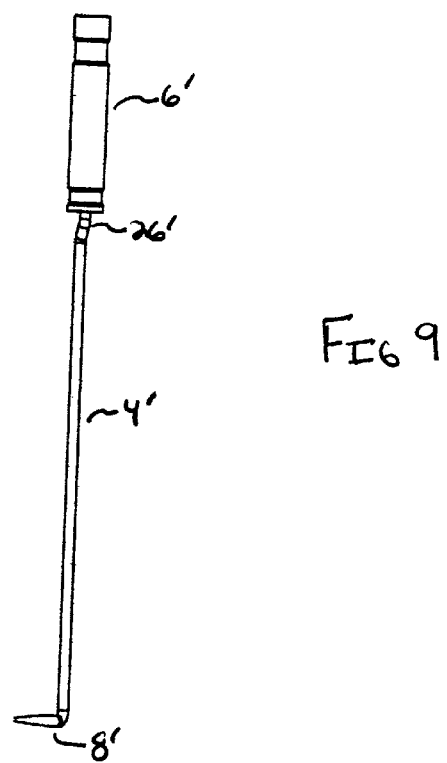
FIG. 9 is a top view of-the utensil shown in FIG. 8.
Figure 8:
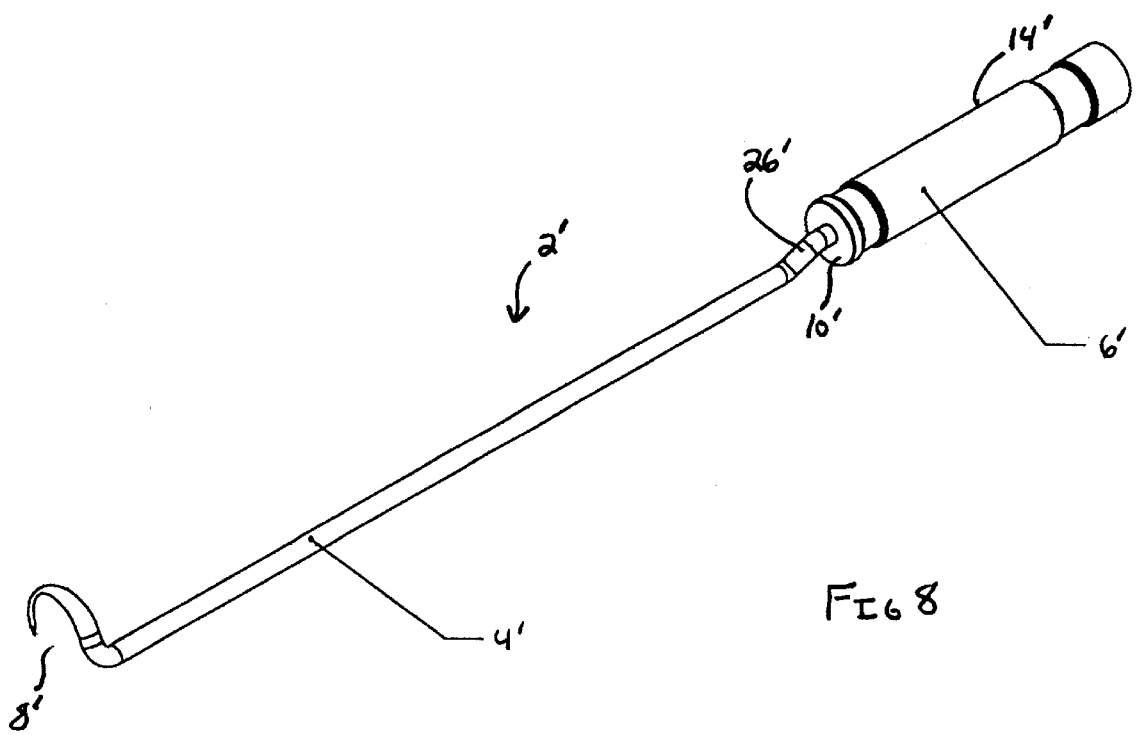
FIG. 8 is a perspective view of a second embodiment of a utensil according to the present invention.
Figure 10:
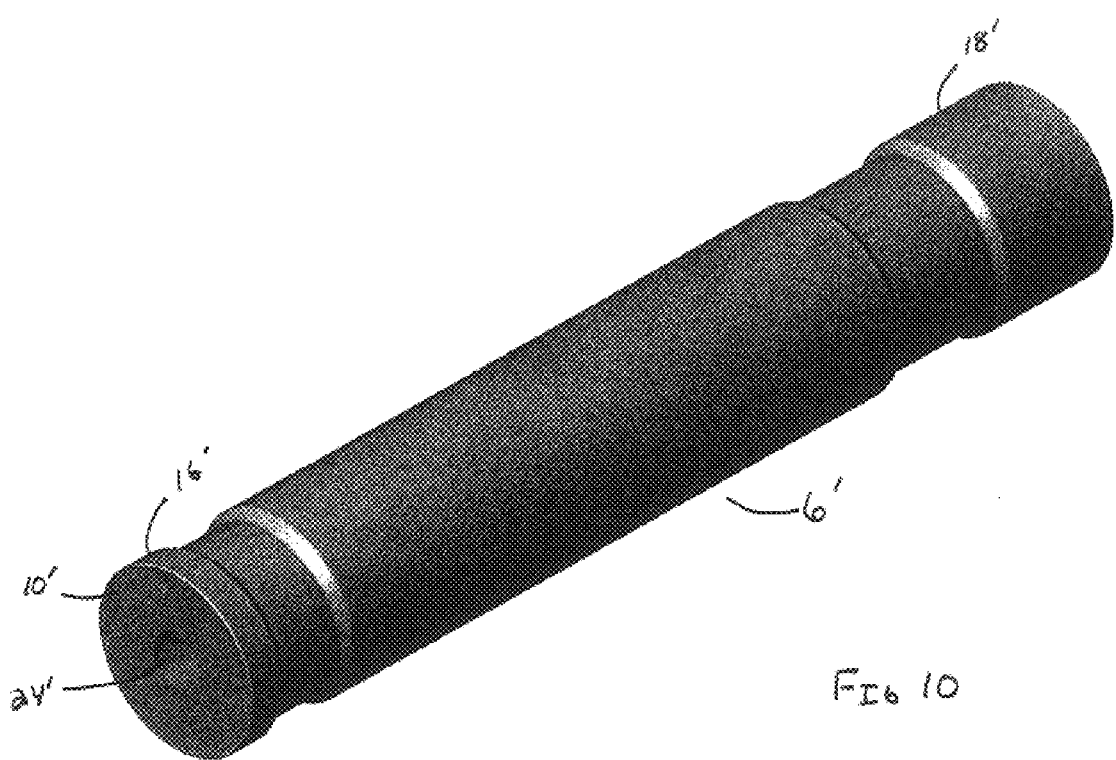
FIG. 10 is a perspective view of a handle of the utensil shown in FIG. 8.
Figure 13:
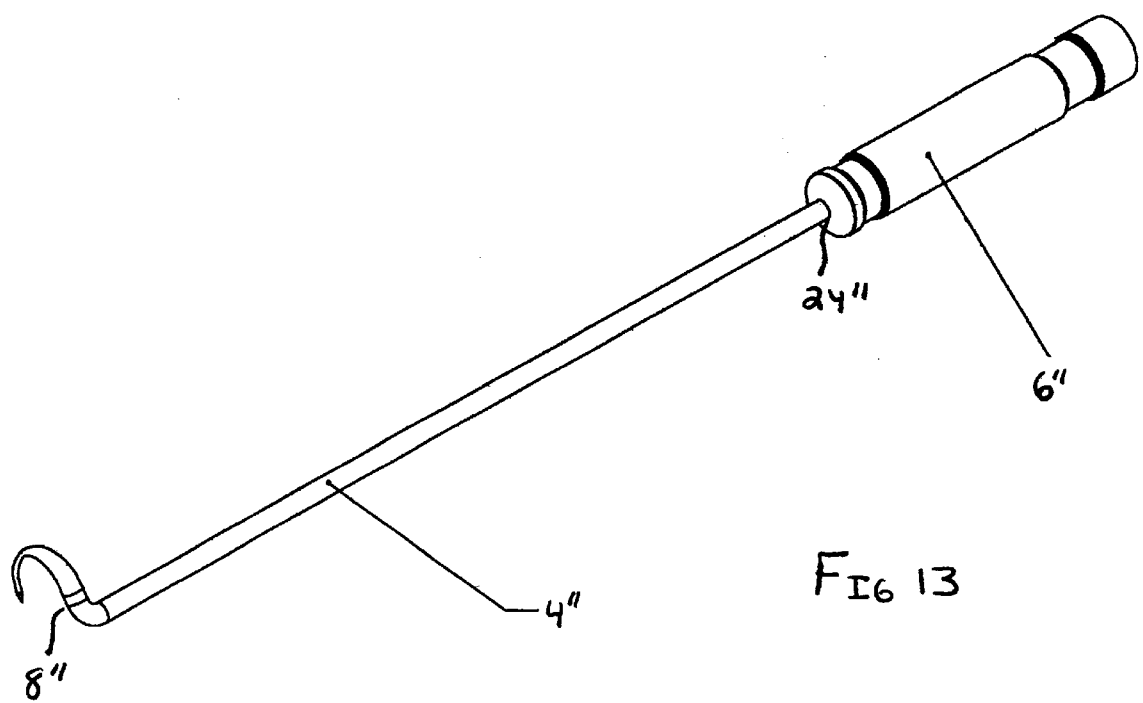
FIG. 13 is a perspective view of a fourth embodiment of a utensil according to the present invention.

In the embodiment shown in FIGS. 8 through 10, the shaft receiving opening 24' extends from the shaft receiving end 10' toward the closed end 12' and has a constant diameter throughout. The opening 24' is positioned along the longitudinal axis of the handle 6'. In this embodiment, the shaft 4' has an offset 26'. The offset 26' allows a portion of the shaft to be offset from a line which extends through the longitudinal axis of the handle 6'. Alternatively, as shown in FIG. 13, the opening 24" is offset from the longitudinal axis of the handle 6". In this embodiment the shaft 4" extends in line with the opening and is thereby similarly offset. In an embodiment not shown, the shaft 4" has a transition portion which positions a portion of the shaft 4" approximately inline with the longitudinal axis of the handle, but with a slight offset (approximately one sixteenth of an inch from the axis of the handle).

Referring to FIGS. 1 through 4, the tapered hook 8 is provided at the end of the shaft 4 opposite the handle 6. The tapered hook 8 is produced by forming the end 40 of the shaft 4 into a point and bending an end portion 42 of the shaft at an angle of approximately ninety degrees (90°) to the longitudinal axis of the shaft. The end portion 42 is then bent into the arcuate configuration shown in the figures. The particular order in which the tapered hook 8 is formed can vary without departing from the scope of the invention. The tip of the hook 8 is configured to pierce the food items. In order to efficiently pierce the food items, the tip may have a sharp point. In the alternative, the tip may have a rounded diameter of approximately 0.015 inches. This rounded tip, having the approximate sharpness of the tip of a ball point pen, has proven effective in piercing and manipulating the food items.

The point and the arcuate configuration of the hook 8 allow the user to easily manipulate and turn the food items on the cooking surface. With conventional tools currently available on the market, the user must generally insert the utensil between the cooking surface and the food item, lift the food item, and flip the food item without dropping the food item. As the utensil is not secured to the food item, the act of flipping the food item is problematic and can result in the food item being dropped and wasted. Additionally, the numerous actions involved in flipping food items utilizing conventional tools requires numerous motions which exposes the user's hand to the heat and which can cause damage to the user's hand, wrist, and arm muscles.

In contrast, the design of the present invention is much more user friendly. As the hook is bent relative to the shaft and handle, the utensil of the present invention operates best when the shaft and handle are in a plane which is essentially parallel to the cooking surface of the grill, etc. rather than at an angle required by the prior art utensils. Because of the configuration of the hook and the orientation of the utensil, the point of the hook can easily pierce the top surface of the food item. With the food pierced, the food is temporarily retained on the end of the utensil, allowing the food to be picked up and manipulated. It is important to note that as the food is manipulated, the shaft and handle remain essentially parallel to the cooking surface. Once the food is manipulated, the utensil is easily rotated to cause the hook end to disengage the food. During this rotation, the handle and shaft remain essentially parallel to the cooking surface. Therefore, during the entire operation, the shaft and handle remain parallel to the cooking surface. As the higher heat zone is provided above the cooking surface, it is beneficial from a safety standpoint that the user's hand never be placed in this higher heat zone. As the shaft of the utensil of the present invention has sufficient length and as the shaft is always essentially parallel to the cooking surface, the handle and the hand of the user will never be placed in the higher heat zone, thereby significantly adding to the desirability of the utensil.

It is worth noting that because of the relatively small cross section of the shaft the length of the shaft can be increased without adversely effecting the strength of the shaft or without adding significantly to the weight of the utensil. The light weight aspects of the utensil 2 are important to the overall ergonomics. In addition, the amount of motion required to manipulate the food is significantly reduced when compared to the prior art devices. In use, the user holds the handle such that the shaft is essentially parallel to the working surface. The hook is rotated to impale the food. In order to flip the food, the rotation of the utensil is continued until the food is moved to the position required. The hook is then rotated back to disengage from the food. Therefore, the manipulation of the food does not require the same wear and tear on the user's muscles as devices known in the art. Consequently, the utensil of the present invention, because of its light weight and controlled motion, is an ergonomically friendly design.

The shape of the handle 6 can also enhance the ergonomics of the utensil. As previously discussed, the handle shown in FIGS. 11 through 12 insures that the user's hand is properly positioned as the utensil is grasped. This eliminates needless rotation and causes less stress for the user.

As with any cooking utensil having a sharp surface or point, safety issues are always of primary concern. In order to minimize any accidental contact with the point end 40 of the utensil 2, the utensil is weighted such that the point is always facing down when laid on a surface. To facilitate this orientation, the longitudinal axis of the handle 6 is offset from the longitudinal axis of at least a portion of the shaft.

The offset of the storage mechanism 28 also contributes to the offset weighting of the utensil. Additionally, the point is offset from the centerline of the handle. The centerline of the shaft is offset approximately 25 degrees from a perpendicular line drawn from the point of the hook to the outside radius of the hook shank. Consequently, regardless of the rotational orientation of the shaft when it is laid on a flat surface, gravity will cause the utensil to rotate and come to rest with the tip of the hook pointing down and resting in contact with the flat surface. FIGS. 8 through 10 illustrate this same concept except an approximate ¼" offset is created in the shaft at the handle end, the shaft attachment is at the centerline of the handle.

In addition to the safety feature described above, the storage mechanism 28 is configured such that as the utensil is hung from a peg or the like, the point projections toward the wall or hanging surface. This eliminates the possibility of accidental contact with the point end of the utensil.

The utensil 2 is also easy to clean. As the shaft and hook are made from a uniform material, which has no recesses or cavities provided therein, the utensil is easily cleaned by wiping or rinsing. The utensil is designed primarily for use as a cook's implement to manipulate food during the cooking, processing, and preparation operations by piercing and securing the food by the pointed, hooked end of the utensil. Examples of such food include, but are not limited to, steaks, porkchops, ears of corn, poultry, and other foods which are of a texture that allows the item to be impaled and suspended without breaking up under its own weight. Certain foods, such as hotdogs, may be turned or manipulated without piercing by using the curved end of the hook for pushing or pulling with the face surfaces of the hook. The tool can also be employed to secure and manipulate other items or materials such as cloth, paper, and others that allow piercing with the tip or manipulation with the radius of the hooked end. Other applications may include, but not be limited to, engaging the hooked end with cooking containers such as pan lids or cooking containers having bails or handles that can nest in the curved end and thereby be engaged and moved. In addition, the utensil provides a means of breaking food loose that may become seared to some cooking surfaces. Placing the hook over a grill rod section and moving it along the rod results in separating the stuck food as well as removing a portion of food residue from the cooking surface that may accumulate during the cooking process. The utensil has also proved practical for piercing and suspending certain foods near a heat source such as a campfire to provide a means of cooking without any other cooking surface or devices.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A cooking utensil comprising:
   a handle having a shaft receiving end and an opposed end;
   a shaft extending from the shaft receiving end in a direction away from the opposed end, at least a portion of the shaft is offset from a longitudinal axis of the handle;
   a food manipulation member extending from the shaft at a free end of the shaft which is removed from a fixed end of the shaft which engages the handle, the food manipulation member extends from the shaft in essentially a perpendicular direction to the shaft, the food manipulation member has an arcuate configuration with a point provided at the end of the food manipulation member which is removed from the shaft, whereby regardless of the rotational orientation of the shaft when placed on a surface, the cooking utensil will rotate so that the point will face toward the surface.

2. The cooking utensil as recited in claim 1 wherein the shaft is made from stainless steel.

3. The cooking utensil as recited in claim 1 wherein shoulders extend circumferentially about the handle proximate the shaft receiving end and the opposed end.

4. The cooking utensil as recited in claim 1 wherein the handle has indentations provided thereon to cooperate with the user's finger to allow the user to better manipulate the cooking utensil.

5. The cooking utensil as recited in claim 1 wherein a storage mechanism is provided at the opposed end of the handle, the storage member is offset from a longitudinal axis of the handle.

6. The cooking utensil as recited in claim 1 wherein the shaft has magnetic properties.

7. A cooking utensil comprising:

a handle having a shaft receiving end and an opposed end;

a shaft extending from the shaft receiving end in a direction away from the opposed end, a portion of the shaft being offset from the longitudinal axis of the handle;

a food manipulation member extending from the shaft at a free end of the shaft which is removed from a fixed end of the shaft which engages the handle, the food manipulation member extends from the shaft in essentially a perpendicular direction to the shaft, a free end of the food manipulation member is offset from the longitudinal axis of the handle, the free end having a point provided thereon;

whereby regardless of the rotational orientation of the shaft when placed on a flat surface, the cooking utensil will rotate such that the point is in contact with the flat surface.

8. The cooking utensil as recited in claim 7 wherein the food manipulation member has a arcuate configuration with the point provided at the end of thereof, whereby as the cooking utensil is used to prepare food, the shaft remains essentially parallel to a cooking surface to prevent a user's hand from being exposed to the heat of the cooking surface.

9. The cooking utensil as recited in claim 7 wherein the handle has a shaft receiving opening which extends from the shaft receiving end toward the opposed end, the shaft receiving opening is offset from the longitudinal axis of the handle and is dimensioned to receiving the shaft therein.

10. The cooking utensil as recited in claim 9 wherein the shaft has a generally cylindrical configuration which extends essentially parallel to the longitudinal axis of the handle.

11. The cooking utensil as recited in claim 9 wherein the shaft has an offset portion which positions a portion of the handle in line with the longitudinal axis of the handle.

12. The cooking utensil as recited in claim 7 wherein the handle has a shaft receiving opening which extends from the shaft receiving end toward the opposed end, the shaft receiving opening is in line with the longitudinal axis of the handle and is dimensioned to receiving the shaft therein.

13. The cooking utensil as recited in claim 12 wherein the shaft has an offset portion which positions a portion of the shaft to be offset from the longitudinal axis of the handle.

14. The cooking utensil as recited in claim 7 wherein the shaft is made from stainless steel.

15. The cooking utensil as recited in claim 7 wherein the handle has indentations provided thereon to cooperate with the user's finger to allow the user to better manipulate the cooking utensil.

16. The cooking utensil as recited in claim 15 wherein a storage mechanism is provided at the opposed end of the handle to facilitate the storage of the cooking utensil when not in use.

17. The cooking utensil as recited in claim 7 wherein the shaft has magnetic properties.

18. A cooking utensil comprising:

a handle having a shaft receiving end and an opposed end;

a shaft extending from the shaft receiving end in a direction away from the opposed end;

a food manipulation member extending from the shaft at a free end of the shaft which is removed from a fixed end of the shaft which engages the handle, the food manipulation member extends from the shaft in essentially a perpendicular direction to the shaft, a point is provided at the end of the food manipulation member, the point is offset from the longitudinal axis of the handle, so that as the handle is rotated, the point pierces a surface of a food item, allowing the food item to be picked up and manipulated;

the weight of the cooking utensil is offset from a longitudinal axis of the handle, whereby regardless of the rotational orientation of the cooking utensil when it is laid on a surface, gravity will cause the cooking utensil to rotate so that the point will face the surface.

19. The cooking utensil as recited in claim 18 wherein the longitudinal axis of the handle is offset from the longitudinal axis of at least a portion of the shaft.

20. The cooking utensil as recited in claim 18 wherein a storage member is offset from the longitudinal axis of the handle.

* * * * *